US008675821B2

(12) United States Patent
Yang et al.

(10) Patent No.: US 8,675,821 B2
(45) Date of Patent: Mar. 18, 2014

(54) NETWORK AUDIO TESTING SYSTEM AND NETWORK AUDIO TESTING METHOD THEREOF

(71) Applicant: UNIHAN Coporation, Taipei (TW)

(72) Inventors: Chih-Kai Yang, Taipei (TW); Shuang-An Lee, Taipei (TW)

(73) Assignee: Pegatron Corporation, Taipei (TW)

( * ) Notice: Subject to any disclaimer, the term of this patent is extended or adjusted under 35 U.S.C. 154(b) by 0 days.

(21) Appl. No.: 13/954,489

(22) Filed: Jul. 30, 2013

(65) Prior Publication Data

US 2014/0037073 A1 Feb. 6, 2014

(30) Foreign Application Priority Data

Jul. 31, 2012 (TW) .............................. 101127587 A

(51) Int. Cl.
*H04M 1/24* (2006.01)
*H04M 3/08* (2006.01)
*H04M 3/22* (2006.01)

(52) U.S. Cl.
USPC ........ 379/1.01; 379/1.02; 379/22.02; 379/24; 702/189; 702/193

(58) Field of Classification Search
USPC ......... 379/1.01, 1.02, 3, 21, 22.02, 22.08, 24, 379/27.03, 406.03, 406.06, 406.01; 702/182, 183, 189, 190, 191, 193; 704/220, 258, 263
See application file for complete search history.

(56) References Cited

U.S. PATENT DOCUMENTS

| 5,008,923 | A | * | 4/1991 | Kitamura et al. ................. 379/3 |
| 6,141,415 | A | * | 10/2000 | Rao ........................... 379/406.08 |
| 6,570,985 | B1 | * | 5/2003 | Romesburg ............... 379/406.08 |
| 6,570,986 | B1 | * | 5/2003 | Wu et al. ................... 379/406.09 |
| 7,787,597 | B1 | * | 8/2010 | Shlomot et al. ................... 379/3 |
| 2008/0255829 | A1 | * | 10/2008 | Cheng ........................... 704/201 |
| 2009/0030536 | A1 | * | 1/2009 | Gur et al. ........................ 700/94 |
| 2009/0245335 | A1 | * | 10/2009 | Fang ............................. 375/222 |
| 2010/0086122 | A1 | * | 4/2010 | Takada ..................... 379/406.08 |
| 2012/0278041 | A1 | * | 11/2012 | Haulick et al. ................ 702/182 |

* cited by examiner

*Primary Examiner* — Binh Tieu
(74) *Attorney, Agent, or Firm* — Muncy, Geissler, Olds & Lowe, P.C.

(57) ABSTRACT

A network audio testing system and a network audio testing method thereof for testing the performance of a network communication system during communication are disclosed. The system includes a processing system and a sound simulation device. The processing system is for generating a near-end simulation signal and a far-end simulation signal. The sound simulation device is for receiving and making a near-end simulation sound. The near-end simulation sound is received by a microphone of the network communication system to generate a first test signal. The processing system further simultaneously makes the sound simulation device sounding the near-end simulation sound and a speaker sounding a far-end simulation sound to obtain a second test signal. The processing system compares the first and the second test signal to obtain an attenuation degree of the near-end simulation signal and a residual energy of the far-end simulation signal.

13 Claims, 8 Drawing Sheets

NETWORK AUDIO TESTING SYSTEM AND NETWORK AUDIO TESTING METHOD THEREOF

BACKGROUND OF THE INVENTION

1. Field of Invention

The invention relates to a network audio testing system and the network audio testing method thereof and, in particular, to a network audio testing system and the network audio testing method thereof that can test the performance of a network communication system during communication.

2. Related Art

With the progress of technology, the network speed today has become increasingly fast. Therefore, a network communication system for voice communication using a network has been widely used by users. During the two-way communication under the hands-free mode of the network communication system, a user may sometimes hear his or her own voice or cannot hear the voice of another users. Therefore the network communication systems available in the market utilize various voice signal processing solutions to reduce external noises, and each solution has its uniqueness. However, in the prior art there is no objective evaluation method to distinguish the pros and cons of the network communication systems regarding voice processing performances.

The voice tests in the prior art mostly focus on simplex voice tests, such as frequency responses, volume levels and voice distortion degrees. The reason is that it is easier to implement simplex tests; there is no other interference source. Currently a duplex test method has been disclosed in ITU-T P.340, which records the attenuation degree of the voice signal during its transmission. However, the test method of ITU-T P340 only records the attenuation degree of the duplex transmission. It cannot test the residual energy of the echo of the network communication system or the attenuation degree of the energy transmitting signals.

Therefore, a new network audio testing system and the network audio testing method thereof is required to solve this issues in the prior art mentioned above.

SUMMARY OF THE INVENTION

The objective of the invention is to provide a network audio testing system which has the function of testing the performance of the network communication system during communication.

To achieve the above objective, the network audio testing system includes a processing system, a sound simulation device and a memory module. The processing system is connected with the network communication system via a network environment for generating a near-end simulation signal and a far-end simulation signal, wherein the waveform of the near-end simulation signal is different from the waveform of the far-end simulation signal. The sound simulation device is electrically connected with the processing system for receiving the near-end simulation signal and making a near-end simulation sound, wherein the near-end simulation sound is received by the microphone to obtain a first test signal transmitted to the processing system. The memory module is electrically connected with the processing system for storing the first test signal. The processing system further simultaneously makes the near-end simulation sound using the sound simulation device and transmits the far-end simulation signal to the speaker to make a far-end simulation sound, and the microphone receives to obtain a second test signal transmitted to the processing system. The processing system compares the first test signal with the second test signal to obtain an attenuation degree of the near-end simulation signal and a residual energy of the far-end simulation signal.

The network audio testing method includes the following steps: performing a first test procedure, including: using a sound simulation device to receive a near-end simulation signal and making a near-end simulation sound, and receiving the near-end simulation sound by the microphone of the network communication system to store a first test signal; performing a second test procedure, including: simultaneously using the sound simulation device to make the near-end simulation sound and using the speaker of the network communication system to receive a far-end simulation signal to make a far-end simulation sound, wherein the waveform of the near-end simulation signal is different from the waveform of the far-end simulation signal, and receiving by the microphone of the network communication system to obtain a second test signal; and comparing the first test signal with the second test signal to obtain an attenuation degree of the near-end simulation signal and a residual energy of the far-end simulation signal.

DETAILED DESCRIPTION OF THE INVENTION

The present invention will be apparent from the following detailed description, which proceeds with reference to the accompanying drawings, wherein the same references relate to the same elements.

Figure 1:
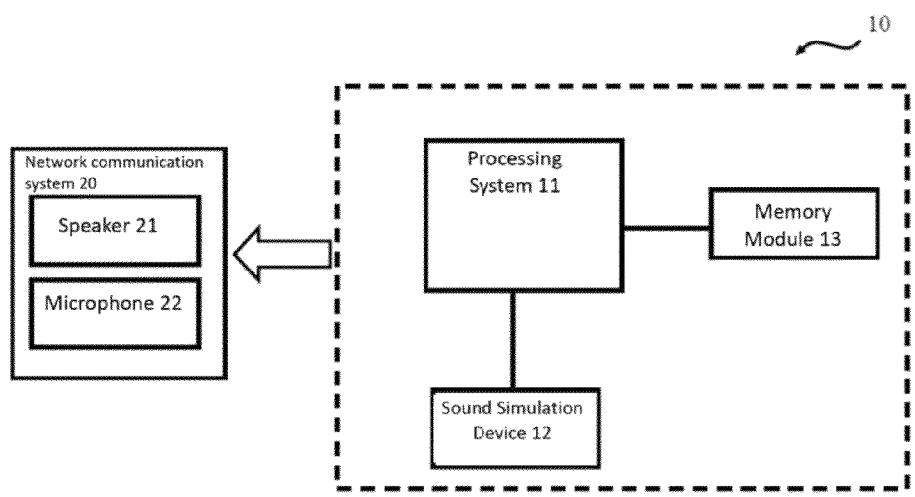
FIG. 1 is a schematic diagram of the architecture of the network audio testing system according to one embodiment of the invention.

Please refer to FIG. 1, which is a schematic diagram of the architecture of the network audio testing system according to one embodiment of the invention.

The network audio testing system 10 of the embodiment is used to test the performance of a network communication system 20 during communication. The network communication system 20 may be a mobile phone, a tablet PC, a notebook computer, a network phone or any device which has voice communication functionalities. The network communication system 20 has a speaker 21 and a microphone 22 for a user to perform a voice communication with another network communication system 20 via a network environment. The network communication system 20 may have the functions of echo suppression and duplex communication quality control by AEC (acoustic echo cancellation) mechanism. The network audio testing system 10 uses two test procedures to test the duplex voice communication quality of the network communication system 20, that is, the effect of the AEC mechanism mentioned above. However, the invention is not limited to only test the duplex voice communication quality achieved based on this mechanism.

The network audio testing system 10 includes a processing system 11, a sound simulation device 12 and a memory module 13. The processing system 11 may be a computer system, such as a desktop computer or a notebook computer. The invention is not limited therein. The processing system 11 may be of another architecture composed of hardware, the combination of hardware and software, or the combination of hardware and firmware. The processing system 11 is connected with the network communication system 20, and is capable of setting a near-end simulation signal S1 and a far-end simulation signal S2 to test the network communication system 20.

Figure 1A:
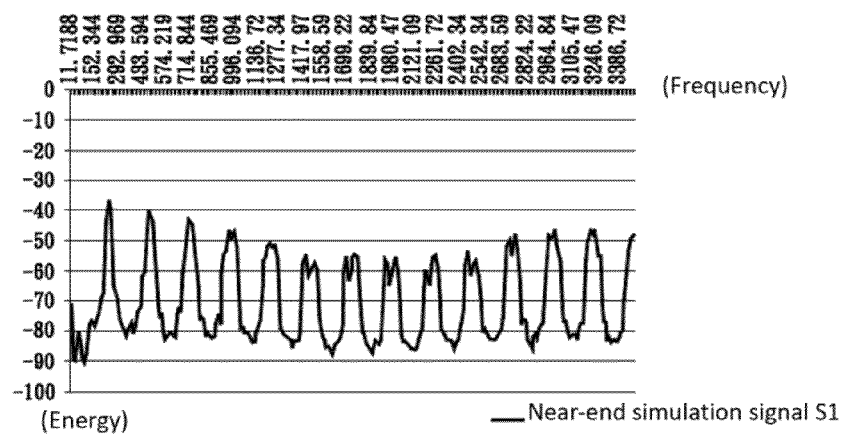
FIG. 1A is a waveform schematic diagram of the near-end simulation signal according to the embodiment of the invention.
Figure 1B:
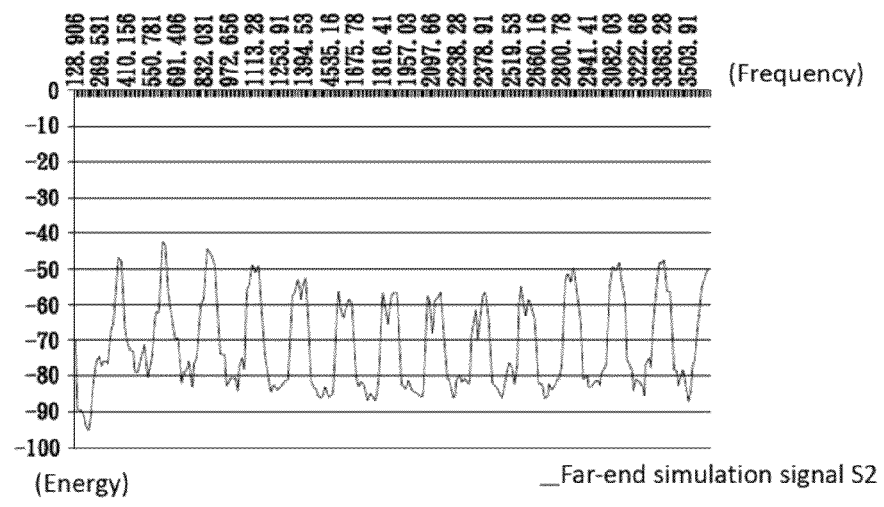
FIG. 1B is a waveform schematic diagram of the far-end simulation signal according to the embodiment of the invention.

Please refer to FIG. 1A and FIG. 1B. FIG. 1A is a waveform schematic diagram of the near-end simulation signal according to the embodiment of the invention, and FIG. 1B is a waveform schematic diagram of the far-end simulation signal according to the embodiment of the invention.

The near-end simulation signal S1 and the far-end simulation signal S2 have different waveforms and frequencies to obtain a better test result during subsequent comparisons. The preferred connection between the processing system 11 and the network communication system 20 is a network-environment connection to actually simulate the performance of the quality of the duplex voice communication of the network communication system 20. However, the invention is not limited therein.

Figure 3:
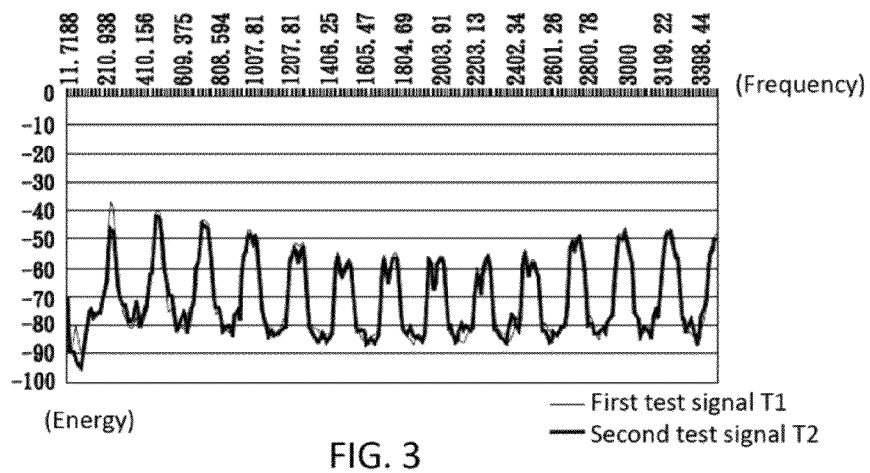
FIG. 3 is a schematic comparison diagram showing the test performed by the network audio testing system to a preferred network communication system.

The sound simulation device 12 is electrically connected with the processing system 11, and can make sound through the control of the processing unit 11. The height of the sound simulation device 12 and the distance between the sound simulation device 12 and the network communication system 20 are equivalent to the height and distance under the normal usage of a user to simulate the way the user makes a sound. As a result, in the first test procedure, the processing system 11 transmits the near-end simulation signal S1 to the sound simulation device 12 to make the near-end simulation sound V1 using the sound simulation device 12 first. The near-end simulation sound V1 made by the sound simulation device 12 is received by the microphone 22 of the network communication system 20 to obtain a first test signal T1 which is transmitted to the processing system 11. For the convenience of analyzing the characteristics of sound, the processing system 11 performs a Fourier transform to the first test signal T1 first to transform the waveform of the sound from the time domain to the frequency domain (as shown in FIG. 3). The memory module 13 is constructed by hardware and an electrically connected with the processing system 11 to record the data of the first test signal T1 after the Fourier transform is performed.

Subsequently in the second test procedure, the processing system 11 again makes the near-end simulation signal S1 to the sound simulation device 12 to have the sound simulation device 12 make the near-end simulation sound V1, while simultaneously transmits the far-end simulation signal S2 to the network communication system 20 to have the speaker 21 make the far-end simulation sound V2. Under this situation, the microphone 22 of the network communication system 20 would simultaneously receive the near-end simulation sound V1 made by the sound simulation device 12 and the far-end simulation sound V2 made by the speaker 21. A second test signal T2 is obtained, and then the processing system 11 performs a Fourier transform to the second test signal T2 for the comparison with the first test signal T1. Generally speaking, the network communication system 20 would suppress the far-end simulation sound V2 received by the microphone 22 again, and try to maintain the energy of the near-end simulation sound V1 received by the microphone 22 to reduce the attenuation degree of the near-end simulation signal S1 and obtain a better voice communication quality. Therefore, the attenuation degree of the near-end simulation signal S1 and the residual energy of the far-end simulation signal S2 receiver by the network communication system 20 can be obtained by comparing the first test signal T1 and the second test signal T2 by the processing system 11. Since the way the network communication system 20 operates is not the key point of the invention, relevant descriptions are omitted here for concise purpose.

Figure 2:
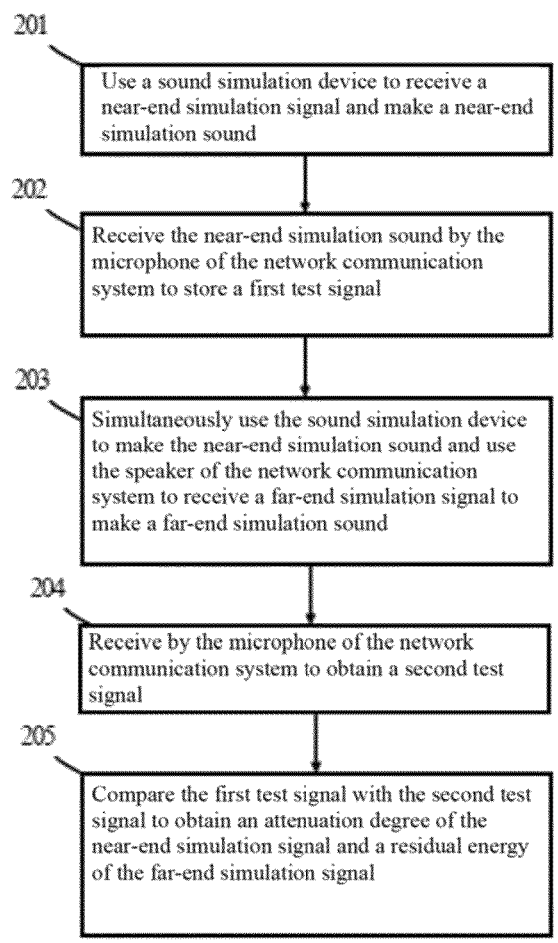
FIG. 2 is a flowchart of the network audio testing method according to an embodiment of the invention.

As for the detailed test procedure of the network audio test system 10, please refer to FIG. 2, which is a flowchart of the network audio testing method according to an embodiment of the invention. Note that although the network audio testing system 10 is used to explain the network audio testing method according to the embodiment, the network audio testing method of the invention is not limited by using the network audio testing system 10 mentioned above.

To test the network communication system 20, the network audio testing system 10 performs two test procedures. First, the network audio testing system 10 performs a first test procedure, that is, step 201: using a sound simulation device to receive a near-end simulation signal and make a near-end simulation sound.

Figure 2A:
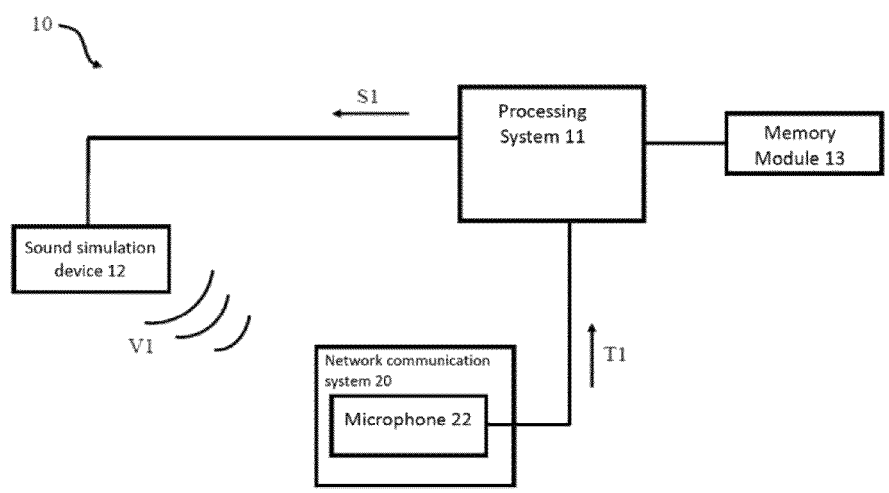
FIG. 2A is a schematic diagram showing the network audio testing system performing the first test according to the embodiment of the invention.

First please refer to FIG. 2A. FIG. 2A is a schematic diagram showing the network audio testing system performing the first test according to the embodiment of the invention.

The processing system 11 sets the near-end simulation signal S1 first, and then transmits it to the sound simulation device 12 so that the sound simulation device 12 makes a near-end simulation sound V1 simulating the way of a user making a sound.

Next, step 202 is performed: receiving the near-end simulation sound by the microphone of the network communication system to store a first test signal.

The near-end simulation sound V1 made by the sound simulation device 12 is received by the microphone 22 of the network communication system 20. The network communication system 20 processes to obtain the first test signal T1 and transmit it to the processing system 11 via a network environment. Also, in this step 202, the processing system 11 performs a Fourier transform to the first test signal T1. Lastly, the first test signal T1 is stored in the memory module 13.

Subsequently the network audio test system 10 performs a second test procedure, that is, the step 203: simultaneously using the sound simulation device to make the near-end simulation sound and using the speaker of the network communication system to receive a far-end simulation signal to make a far-end simulation sound.

Figure 2B:
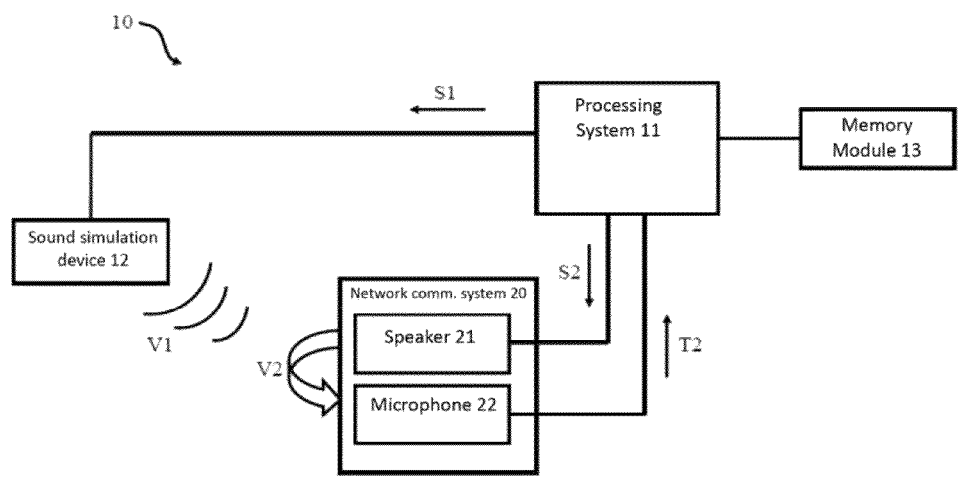
FIG. 2B is a schematic diagram showing the network audio testing system performing the second test according to the embodiment of the invention.

Here please refer to FIG. 2B. FIG. 2B is a schematic diagram showing the network audio testing system performing the second test according to the embodiment of the invention.

The processing system 11 sets the far-end simulation signal S2, and transmits the near-end simulation signal S1 to the sound simulation device 12 and the far-end simulation signal S2 to the speaker 21 of the network communication system 20 simultaneously to control the sound simulation device 12 to make the near-end simulation sound V1 and the speaker 21 of the network communication system 20 to make the far-end simulation sound V2. The far-end simulation signal S1 and the near-end simulation signal S1 have different waveforms.

Then step 204 is performed: receiving by the microphone of the network communication system to obtain a second test signal.

The microphone 22 of the network communication system 20 then receives the external near-end simulation sound V1 and the far-end simulation sound V2. And then, the network communication system 20 processes the sound received to obtain the second test signal T2 and transmits it to the processing system 11. Similarly, in this step 204, the processing system performs a Fourier transform to the second test signal T2 for the convenience of performing subsequent signal processing.

Lastly step 205 is performed: comparing the first test signal with the second test signal to obtain an attenuation degree of the near-end simulation signal and a residual energy of the far-end simulation signal.

Lastly the processing system 11 compares the Fourier-transformed first test signal T1 with the second test signal 12 to obtain the attenuation degree of the near-end simulation signal S1 and the residual energy of the far-end simulation signal S2. This is as shown in FIG. 3. FIG. 3 is a schematic comparison diagram showing the test performed by the network audio testing system to a preferred network communication system.

The network communication system having a better performance would reduce the attenuation degree of the near-end simulation signal S1, and reduce the far-end simulation signal S2 received by the microphone 22. Therefore, as shown in FIG. 3, the closer the first test signal T1 and the second test signal T2 obtained by the network audio testing method of the embodiment, the lower the attenuation degree of the near-end simulation signal S1 and the lesser residual energy of the far-end simulation signal S2.

Figure 4:
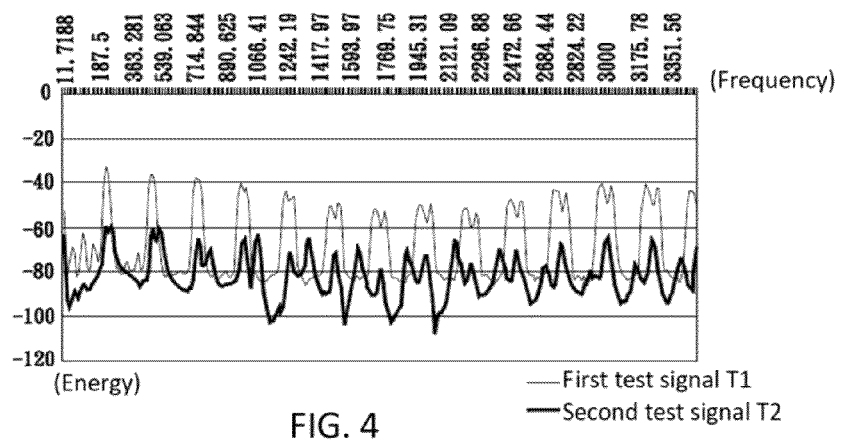
FIG. 4 is a schematic comparison diagram showing the test performed by the network audio testing system to a poorer network communication system.

Lastly please refer to FIG. 4, which is a schematic comparison diagram showing the test performed by the network audio testing system to a poorer network communication system.

On the other hand, the larger difference between the first test signal T1 and the second test signal T2, the higher the attenuation degree of the near-end simulation signal S1 and the more residual energy of the far-end simulation signal S2. FIG. 4 represents a network communication system 20 which performance is poorer. The attenuation degree of the near-end simulation signal S1 can be further obtained from a peak of the waveform of the first test signal T1 and the waveform of the second test signal T2. When the difference between the signal strength of the peak of the waveform of the first test signal T1 and the signal strength of the place of the second test signal T2 having the same frequency is larger, the attenuation degree of the near-end simulation signal S1 is higher. The residual energy of the far-end simulation signal S2 is obtained by comparing a trough of the first test signal T1 with the second test signal T2. When the difference between the signal strength of the trough of the first test signal and the signal strength of the place of the second test signal T2 having the same frequency is larger, much residual energy of the far-end simulation signal S2 exists and has not been removed. The pros and cons of different network communication systems 20 can be shown accordingly.

Note that the network audio testing method is not limited to the order of the steps mentioned above. The order of the steps may be changed to achieve the objective of the invention.

The network audio testing system 10 may further lists the performance of different network communication systems 20 together to store the statistic result in the memory module 13 for future accesses. Therefore, the network audio testing system 10 according to the embodiment may use the difference of the waveforms between the first test signal T1 and the second test signal T2 to conveniently and accurately test the communication performance of different network communication systems 20. Quantitative data can be obtained to evaluate different network communication systems 20 objectively.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A network audio testing system for testing performance of a network communication system during communication, the network communication system having a speaker and a microphone, the network audio testing system comprising:
   a processing system connected with the network communication system via a network environment for generating a near-end simulation signal and a far-end simulation signal, wherein the waveform of the near-end simulation signal is different from the waveform of the far-end simulation signal;
   a sound simulation device electrically connected with the processing system for receiving the near-end simulation signal and making a near-end simulation sound, the near-end simulation sound being received by the microphone to obtain a first test signal transmitted to the processing system; and
   a memory module electrically connected with the processing system for storing the first test signal,
   wherein the processing system further simultaneously makes the near-end simulation sound using the sound simulation device and transmits the far-end simulation signal to the speaker to make a far-end simulation sound, the microphone receives to obtain a second test signal transmitted to the processing system, the processing system compares the first test signal with the second test signal to obtain an attenuation degree of the near-end simulation signal and a residual energy of the far-end simulation signal.

2. The network audio testing system according to claim 1, wherein the processing system compares a trough of the first test signal with the second test signal to obtain the residual energy of the far-end simulation signal.

3. The network audio testing system according to claim 1, wherein the processing system compares a peak of the first test signal with the second test signal to obtain the attenuation degree of the near-end simulation signal.

4. The network audio testing system according to claim 1, wherein the sound simulation device is used to simulate the way a user makes a sound.

5. The network audio testing system according to claim 1, wherein the processing system performs Fourier transforms to the first test signal and the second test signal.

6. The network audio testing system according to claim 1, wherein the processing system further gathers statistics of the performances of different network communication systems.

7. A network audio testing method for testing performance of a network communication system during communication, the network communication system having a speaker and a microphone, the method comprising:
   performing a first test procedure, including:

using a sound simulation device to receive a near-end simulation signal and make a near-end simulation sound, and receiving the near-end simulation sound by the microphone of the network communication system to store a first test signal;

performing a second test procedure, including:

simultaneously using the sound simulation device to make the near-end simulation sound and using the speaker of the network communication system to receive a far-end simulation signal to make a far-end simulation sound, wherein the waveform of the near-end simulation signal is different from the waveform of the far-end simulation signal, and receiving by the microphone of the network communication system to obtain a second test signal; and comparing the first test signal with the second test signal to obtain an attenuation degree of the near-end simulation signal and a residual energy of the far-end simulation signal.

8. The network audio testing method according to claim 7, wherein the step of obtaining the residual energy of the far-end simulation signal comprises:

comparing a trough of the first test signal with the second test signal to obtain the residual energy of the far-end simulation signal.

9. The network audio testing method according to claim 7, wherein the step of obtaining the attenuation degree of the near-end simulation signal comprises:

comparing a peak of the first test signal with the second test signal to obtain the attenuation degree of the near-end simulation signal.

10. The network audio testing method according to claim 7, further comprising the step of simulating the way a user makes a sound to make the near-end simulation sound.

11. The network audio testing method according to claim 7, further comprising the step of:

performing Fourier transforms to the first test signal and the second test signal before comparing.

12. The network audio testing method according to claim 7, further comprising the step of connecting to the network communication system via a network environment.

13. The network audio testing method according to claim 7, further comprising the step of gathering statistics of the performances of different network communication systems.

\* \* \* \* \*